United States Patent [19]

Taylor et al.

[11] 4,135,805
[45] Jan. 23, 1979

[54] COUNTERBALANCING APPARATUS

[75] Inventors: Thomas N. Taylor, Rochester; Charles J. Mahler, Fairport, both of N.Y.

[73] Assignee: Xerox Corporation, Stamford, Conn.

[21] Appl. No.: 821,667

[22] Filed: Aug. 4, 1977

[51] Int. Cl.$^2$ ............................................. G03G 15/00
[52] U.S. Cl. ...................................... 355/3 R; 355/75
[58] Field of Search ..................... 355/3 R, 75, 76, 87, 355/91, 93, 94; 267/34, 64 B; 108/2, 136; 49/200

[56] References Cited

U.S. PATENT DOCUMENTS

| | | | |
|---|---|---|---|
| 2,545,964 | 3/1951 | Maxwell | 355/76 |
| 3,198,069 | 8/1965 | Florsheim | 355/75 |
| 3,615,134 | 10/1971 | Newcomb | 355/75 |
| 3,994,582 | 11/1976 | Goshima et al. | 355/75 |

Primary Examiner—Richard L. Moses
Attorney, Agent, or Firm—James J. Ralabate; John E. Beck; Samuel E. Mott, III

[57] ABSTRACT

Apparatus for counterbalancing the movement of a platen cover or document handler between a first closed position and a second open position. The counterbalancing apparatus comprises a gas spring and a tension spring. The tension spring is arranged to increasingly counter the force exerted by the gas spring as the platen cover is moved from the first to the second position. This compensates for the reduced force exerted by the platen cover as it is opened. The platen cover in the second position preferably has moved past vertical and the tension spring is effective to counter the force exerted by the cover between vertical and the second position.

14 Claims, 15 Drawing Figures

COUNTERBALANCING APPARATUS

CROSS REFERENCE TO RELATED APPLICATIONS

U.S. application Ser. No. 811,736, filed June 30, 1977, to Taylor et al, for a Belt Tensioning System; U.S. application Ser. No. 811,735, filed June 30, 1977, to Taylor et al, for an Improved Document Handling Apparatus and Reproducing Machine; and U.S. application Ser. No. 818,781, filed July 25, 1977, to Hacknauer, for a Document Decelerator and Stacker.

BACKGROUND OF THE INVENTION

This invention relates to a counterbalance mechanism. It is particularly adapted for use in conjunction with a document handling apparatus for advancing documents on and off a viewing station of a reproducing machine. A reproducing machine employing the document handler and counterbalance mechanism also forms part of this invention.

PRIOR ART STATEMENT

A variety of devices have been utilized in the prior art for the purpose of counterbalancing the movement of a cover or other type member which is arranged to be opened and closed. These mechanisms have conventionally utilized springs of various types.

Gas springs, as in U.S. Pat. No. 3,207,498 to Wüstenhagen, et al., have found considerable application as counterbalances in the automotive industry for window hatch covers or doors. Their use is, of course, not limited to automotive applications, and they have been used in a wide variety of applications as, for example, that described in U.S. Pat. No. 3,444,830 to Doetsch, wherein a gas spring is used to counterbalance a drawing table. The gas spring in the Doetsch patent includes within the cylinder of the spring a compression spring which comes into action as the piston is withdrawn.

The use of counterbalances for balancing the movement of a platen cover or a document handling system of a reproducing machine are also known. An example of such a device is found in U.S. Pat. No. 3,615,134 to Newcomb. Newcomb discloses a counterbalance mechanism for controlling the position of a platen cover of a reproducing machine. The cover is operatively connected to the mechanism which includes a slide which moves in a horizontal direction as the platen cover is raised or lowered. A pair of mechanically biased members act on the slide and coact with each other to support the cover in a stationary position when the cover is raised above a pre-determined position and automatically moves the cover into closure when it is placed below the predetermined position. Plural springs are employed for biasing the members.

Several reproducing machines currently commercially available employ document handling systems for advancing documents on and off the viewing station of the machine. The document handling systems presently in use may be classified as semi-automatic when the documents are individually manually inserted into the document handler which then feeds them on and off the viewing platen. In some machines fully automatic document handling systems are employed wherein the documents are automatically separated from a stack thereof and serially fed to the platen. In some cases provision has been made to recirculate the documents so that they may be serially fed on and off the platen a desired number of times to form a desired number of sets.

The present invention is particularly adapted for use with document handling systems which employ a single stretch-type document handling belt as the platen transport. Such document handling systems are exemplified by the following U.S. Pat. Nos. 3,565,420 to Howard, 3,889,943 to Krayer, and 3,941,376 to Liechty. In each of these patents a single wide document transport belt is utilized to advance a document on and off the viewing platen of the reproducing machine in a fully automatic or recirculating fashion. The document transport belt is supported about first and second pulleys. This approach is used commercially in the Xerox 9200 duplicator.

U.S. Pat. Nos. 3,844,552 to Bleau, 3,908,986 to Bleau, 3,910,570 to Bleau, are illustrative of semi-automatic type document handling systems. Such systems include a pre-registration station into which the operator manually places a document which is either manually registered against a stop or automatically registered against the stop as in the Bleau '986 patent. U.S. Pat. No. 3,936,041 to Shiina, et al. is illustrative of a fully automatic document handling system wherein documents are separated from a stack and then advanced on and off the platen all automatically without operator intervention. These patents are also of interest for their disclosures with respect to belt transport type document handling systems.

In addition to the aforenoted patents, the following disclosures are believed to be of interest with respect to document handling systems of the type contemplated in accordance with this invention. IBM Technical Disclosure Bulletin, Vol. 19, No. 5, October 1976, pages 1589 to 1591, discloses a semi-automatic document handling system control arrangement employing multiple sensors. IBM Technical Disclosure Bulletin, Vol. 17, No. 4, September 1974, page 1131, discloses a platen registration gate mechanism. IBM Technical Disclosure Bulletin, Vol. 17, No. 4, September 1974, page 1135, discloses an output tray stacking system. The output tray stacker includes a wire guide for decelerating documents entering the tray.

SUMMARY OF THE INVENTION

This invention relates to a counterbalancing mechanism for balancing the movement of a member between first and second positions. The counterbalancing apparatus of this invention is particularly adapted for use in balancing a platen cover member of a reproducing machine or a document handling system and platen cover member combination used with a reproducing machine. A reproducing machine employing the counterbalancing apparatus of this invention is also provided.

The apparatus for counterbalancing the movement of the member comprises the member and means for supporting the member for movement between a first position and a second position. A counterbalancing means is provided for balancing the movement of the member between its respective positions. The counterbalancing means comprises a gas spring and a tension spring each connected to the member. The tension spring is arranged to increasingly counter the force exerted on the gas spring as the member is moved from the first position to the second position.

Preferably the first position is generally horizontal, and the second position is more vertical then the first. In a most preferred embodiment, the second position is arranged past vertical so that a cover member travels from a generally horizontal orientation through vertical to a position past vertical.

Preferably the tension spring is operable over a range of motion of the cover member which is less than its total range of motion. Initial operation of the tension spring is from a position intermediate the first and second positions up to the second position.

Accordingly, it is an object of this invention to provide an improved counterbalancing apparatus.

It is a further object of this invention to provide an apparatus as above utilizing a gas spring and a countering tension spring for counterbalancing the movement of a member.

It is a further object of this invention to provide an apparatus as above used to counterbalance a document handling system of a reproducing machine.

It is a still further object of this invention to provide a reproducing machine employing the document handling system and counterbalancing apparatus as above.

These and other objects will become more apparent from the following description and drawings.

DETAILED DESCRIPTION OF THE PREFERRED EMBODIMENTS

Figure 1:
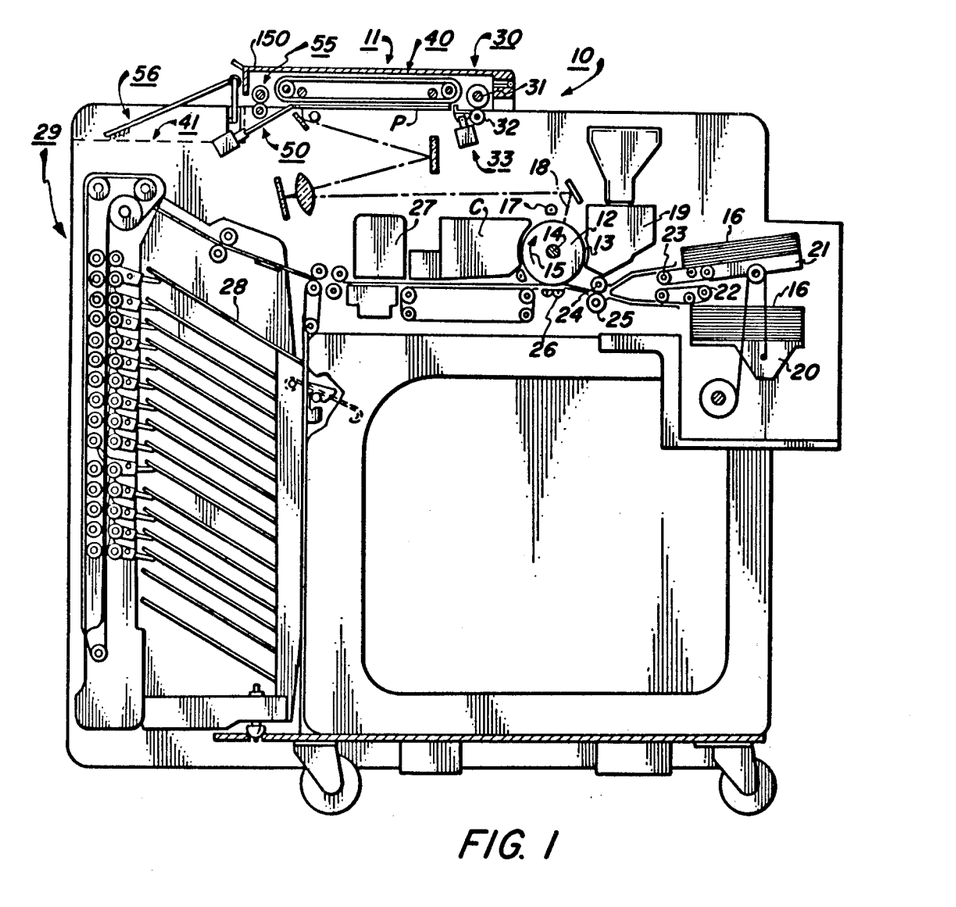
FIG. 1 is a schematic representation of a reproducing apparatus including a document handling system in accordance with this invention.

Referring now to FIG. 1 there is shown by way of example an automatic xerographic reproducing machine 10 which includes a document handling apparatus 11 of the present invention. The reproducing machine 10 depicted in FIG. 1 illustrates the various components utilized therein for producing copies from an original. Although the apparatus 11 of the present invention is particularly well adapted for use in an automatic xerographic reproducing machine 10, it should become evident from the following description that it is equally well suited for use in a wide variety of processing systems including other electrostatographic systems and it is not necessarily limited in its application to the particular embodiment or embodiments shown herein.

The reproducing machine 10 illustrated in FIG. 1 employs an image recording drum-like member 12, the outer periphery of which is coated with a suitable photoconductive material 13. One type of suitable photoconductive material is disclosed in U.S. Pat. No. 2,970,906, issued to Bixby in 1961. The drum 12 is suitably journaled for rotation within a machine frame (not shown) by means of shaft 14 and rotates in the direction indicated by arrow 15 to bring the image-bearing surface 13 thereon past a plurality of xerographic processing stations. Suitable drive means (not shown) are provided to power and coordinate the motion of the various cooperating machine components whereby a faithful reproduction of the original input scene information is recorded upon a sheet of final support material 16 such as paper or the like.

The practice of xerography is well known in the art and is the subject of numerous patents and texts including *Electrophotography* by Schaffert, and *Xerography and Related Processes* by Dessauer and Clark, both published in 1965 by the Focal Press.

Initially, the drum 12 moves the photoconductive surface 13 through a charging station 17. In the charging station 17, an electrostatic charge is placed uniformly over the photoconductive surface 13 preparatory to imaging. The charging may be provided by a corona generating device of the type described in U.S. Pat. No. 2,836,726, issued to Vyverberg in 1958.

Thereafter, the drum 12 is rotated to exposure station 18 wherein the charged photoconductive surface 13 is exposed to a light image of the original input scene information whereby the charge is selectively dissipated in the light exposed regions to record the original input scene in the form of a latent electrostatic image. A suitable exposure system may be of a type described in U.S. Pat. No. 3,832,057, issued to Shogren in 1974. After exposure drum 12 rotates the electrostatic latent image recorded on the photoconductive surface 13 to development station 19 wherein a conventional developer mix is applied to the photoconductive surface 13 of the drum 12 rendering the latent image visible. A suitable development station is disclosed in U.S. Pat. No. 3,707,947, issued to Reichart in 1973. That patent describes a magnetic brush development system utilizing a magnetizable developer mix having coarse ferromagnetic carrier granules and toner colorant particles. The developer mix is brought through a directional flux field to form a brush thereof. The electrostatic latent image recorded on the photoconductive surface 13 is developed by bringing the brush of developer mix into contact therewith.

Sheets 16 of final support material are supported in a stack arrangement on an elevating stack support tray 20 or in an auxiliary tray 21. Sheet separators 22 and 23 selectively feed individual sheets from their respective stacks to a registration system which includes rolls 24 and 25. The sheet is then forwarded to the transfer station 26 in proper registration with the image on the drum. The developed image on the photoconductive surface 13 is brought into contact with the sheet 16 of final support material within the transfer station 26 and the toner image is transferred from the photoconductive surface 13 to the contacting side of the final support sheet 16. The final support material may be paper, plastic, etc., as desired.

After the toner image has been transferred to the sheet of final support material 26 the sheet with the image thereon is advanced to a suitable fuser 27 which coalesces the transferred powder image thereto. One type of suitable fuser is described in U.S. Pat. No. 2,701,765, issued to Codichini, et al. in 1955. After the fusing process the sheet 16 is advanced selectively to a suitable output device such as tray 28 or sorter 29.

Although a preponderance of the toner powder is transferred to the final support material 16, invariably some residual toner remains on the photoconductive surface 13 after the transfer of the toner powder image to the final support material. The residual toner particles remaining on the photoconductive surface 13 after the transfer operation are removed from the drum 12 as it moves through a cleaning station C. The toner particles may be mechanically cleaned from the photoconductive surface 13 by any conventional means as, for example, the use of a blade as set forth in U.S. Pat. No. 3,740,789, issued to Ticknor in 1973.

A document handling system 11 of this invention is used to advance documents on and off a viewing platen P where they are scanned by the optical system 18.

It is believed that the foregoing description is sufficient for purposes of the present application to illustrate the general operation of an automatic xerographic copier 10 which can embody the apparatus 11 in accordance with the present invention.

Referring now to FIGS. 1 through 5, the basic elements of the document handling system 11, in accordance with the present invention, will be described along with their operation. The document handler 11 includes an input transport 30 comprised of input pinch rolls 31 and 32, which are selectively disengageable so that a document may be readily placed between them. The input transport 30 also includes a wait station 33 for pre-registering the document. The wait station 33 is comprised of a pivotally supported registration gate 34 and a pivotally supported upper chute 35. The gate 34, chute 35, and pinch rolls 31 and 32 are inter-connected so that when the gate is up in a sheet 16 blocking position, the pinch rolls are separated. As the gate 34 drops out of sheet blocking position the pinch rolls come together to advance the document into the next station which comprises the belt-type platen transport 40.

A suitable static eliminating device 36 is arranged between the input transport 30 and the platen belt transport 40. In the embodiment shown in FIG. 3, the static eliminator 36 is comprised of a pin-type corona generating device wherein a plurality of pins are spaced transversely to the direction in which the document is moving. The corona generator is arranged to spray the document with an appropriate AC corona to neutralize or discharge any static build-up on the document before it enters the platen transport 40. While it is unusual to place the static eliminating device 36 before the platen belt transport 40, it has been found effective at such a location for reducing the static build-up on the belt and for providing adequate stacking of documents in the output tray 41. For the sake of simplicity the static eliminator 36 is shown solely in FIG. 3, and has been removed from the other views of the apparatus 11 in order to reveal other components.

Referring to FIGS. 1 through 5, the platen belt transport 40 is comprised of a single wide belt 42 having one run 43 over the platen P. This is desirable to avoid the print-out of the belt on the resulting copy sheet. The belt 42 is normally formed of a stretch-type material which is white in color so as to reduce the occurrence of a black border print-out on the copies. The belt 42 is wrapped about two pulleys 44 and 45, which are arranged so that the belt surface at the bottom of a pulley is slightly above the surface of the platen, perhaps by about 0.030 inches. The sag of the belt 42 is sufficient so that the belt engages the platen. The drive force which the belt 42 imparts to the document is controlled by means of back-up rolls 46 and 47, supported internally of the belt.

The input back-up roll 46 is arranged close to the input drive pulley 44, and controls the normal force applied by the belt 42 to the document as it is driven onto the platen P. A platen registration gate 50 is provided at the far end of the platen P. The document is driven by the belt 42 against the gate 50 in order to properly position the document on the platen P for imaging. During the imaging cycle the registration gate 50 is retracted. After imaging the document is advanced off the platen P by means of the belt transport 40 and a set of output pinch rolls 55. The output pinch rolls corrugate the document to increase its beam strength so that it will properly stack in the output tray 41 of the document handling system 11. Document decelerators 56 associated with the output tray 41 act upon the document as it enters the output tray to properly stack it therein.

Figure 2:
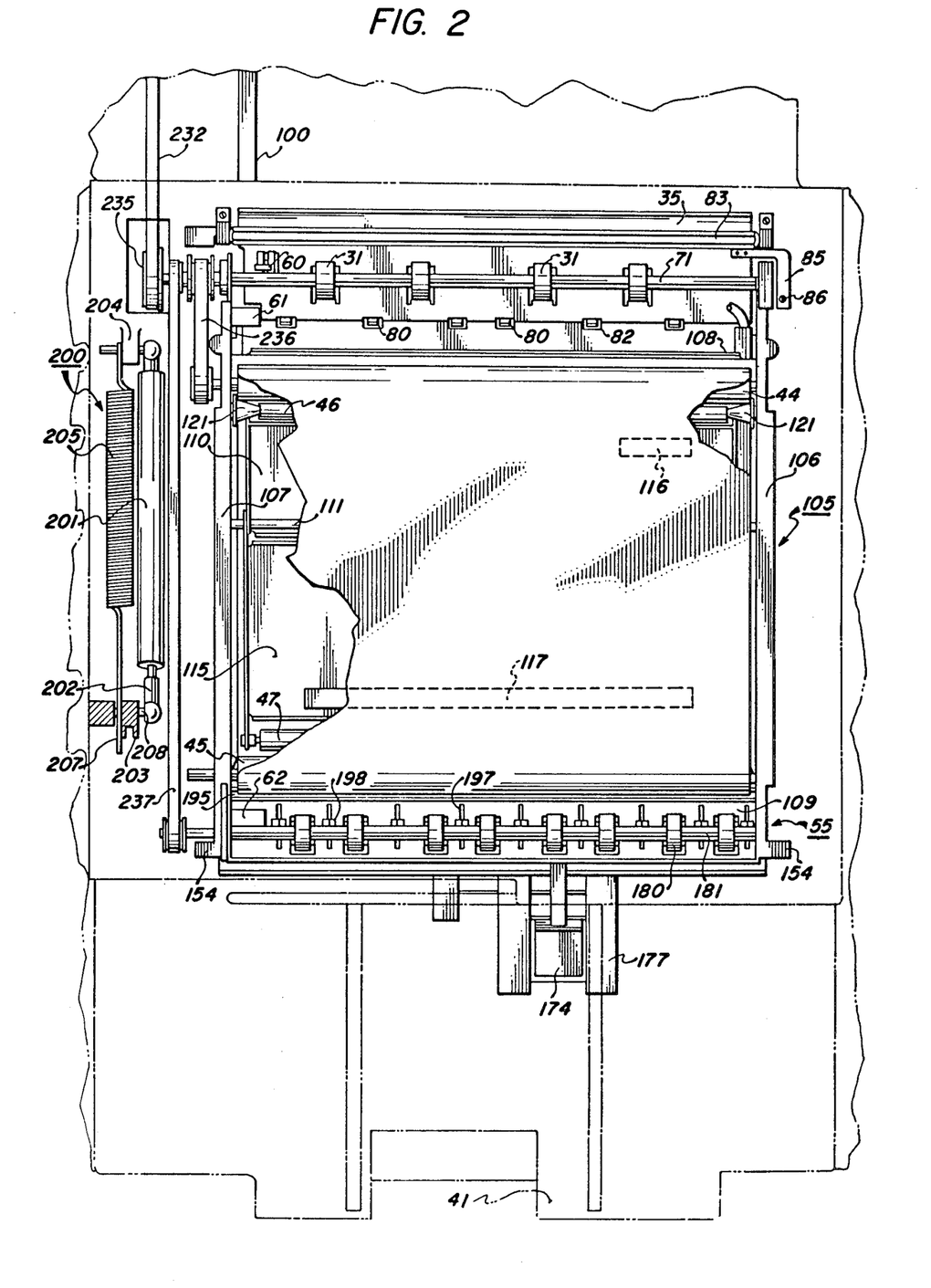
FIG. 2 is a partial top view of the document handling system of FIG. 1 with the cover removed.

The document handling system is actuated by a number of sensors as in FIG. 2. A lever actuated switch 60 is positioned just ahead of the nip of the input transport rolls 31 and 32 and serves to condition the machine for operation in a document handling mode. A second sensor 61, which preferably comprises a photocell, is arranged to sense proper corner registration of the document at the wait station 33. A third sensor 62 also preferably comprising a photocell is used to detect that the document has been advanced off the platen P. The third sensor is arranged just prior to the output pinch rolls 55.

In operation the document handling system 11 is activated by inserting a document into the wait station 33. This actuates the mode switch 60 which in turn activates the input sensor 61 and signals the logic (not shown) of the machine that a "DHS" copy is desired. When the corner of the document interrupts the input registration sensor 61, a ready-to-feed light is lit, and the system is assured that the original has been inserted within a predetermined skew and side shift tolerance. The logic then provides a 0.4 second delay after the start-print button is pressed, or after a second document is inserted when in a chain feed mode. This allows the operator time to let go of the document before it is advanced onto the platen P.

Figure 13:
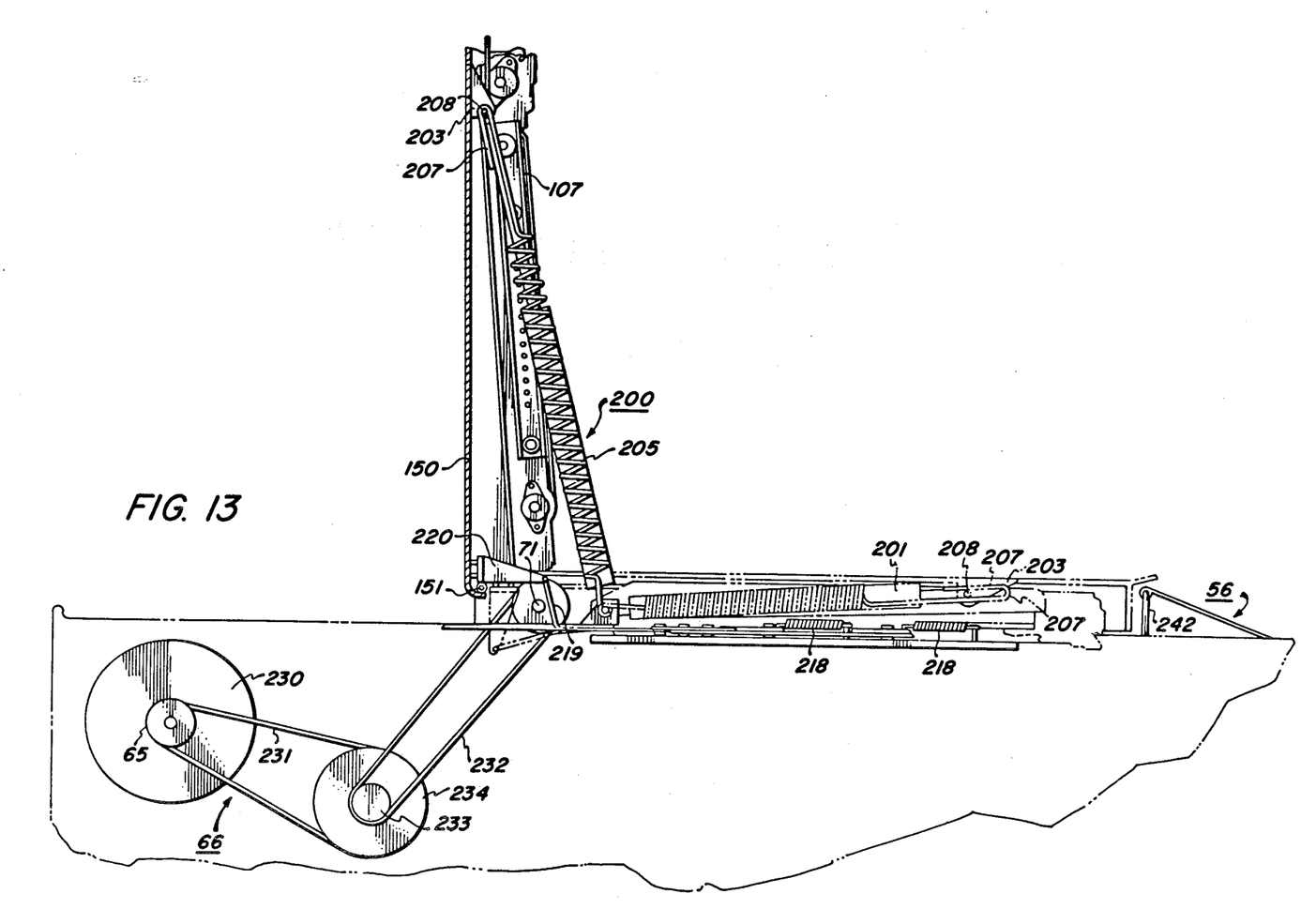
FIG. 13 is a rear view in partial cross-section showing operation of the platen cover counterbalance mechanism and the retractable manual registration guide.

As the wait station 33 fingers 34 retract, the pivoting upper chute 35 is raised which increases the clearance for bulky originals. At the same time the input rolls 31 and 32 pinch is made. A short time later a clutch 65, as in FIG. 13, is actuated and the drives 66 are started. The document is driven onto the platen P by the input rolls 31 and 32 and by the input back-up roll 46 of the belt transport 40.

In the event that a document does not uncover the input sensor 61, a jam is signaled. At an appropriate time the register edge 51 is raised from its normally retracted position. This also raises the registration back-up roll 47 as well. The document is driven against the register edge 51 by the document belt alone, removing any skew by coast over-drive. The register edge 51 is lowered during scan of the exposure system 18.

When scan is complete the drives 66 start again. If a second document has been properly inserted into the wait station 33 during scan, this document will be transported onto the platen P at the same time the first document is fed off. If the second original has not been inserted soon enough to allow the wait station 33 to be actuated, it will be held up at the wait station until the first document is driven off the platen P.

The registration back-up roll 47 provides the necessary normal force to drive the first document off the platen P. If this document does not reach the exit sensor 62 within an alloted time, the logic signals a jam. The exiting document is fed into the exit tray 41 by the output rolls 55 which corrugate it to provide the beam strength needed to stack easily. Failure to leave the exit sensor 62 at the end of a cycle signals a jam.

Having thus described the general features of the document handling system 11 of this invention and its general mode of operation, further detail will now be given for the various sub-assemblies and sub-systems which make up the document handler.

WAIT STATION AND INPUT TRANSPORT

Referring now to FIGS. 2, 3, 6, and 7, the wait station and input transport will be described in greater detail. The wait station 33 and input transport 31 and 32 are supported by a structurally rigid casting or frame member 70 which is connected to the optical frame (not shown) in such a manner as to align the wait station 33 with the optical system 18 to ensure that the input transport 31 and 32 advances the document properly onto the platen P without skew or misregistration. The input transport is comprised of a set of pinch rolls 31 and 32. The four spaced apart upper rolls 31 are mounted to the input roll drive shaft 71 and are used to drivingly engage the document for advancement onto the platen P. The lower input pinch rolls 32 are supported in cantilever fashion by spring members 72 secured to the input frame member 70. Two of the lower input pinch rollers 32 are rotatably supported to idle upon a first shaft 73, and the other two are rotatably supported to idle upon a separate second shaft 74. This helps to provide a uniform normal force between the pinch rollers when they are engaged. The near side lower input pinch roller 32 includes a reduced diameter shoulder 75 so that it will not engage the very end of an 8 ½ × 11 inch sheet. This reduces the propensity for skewing such sheets.

The pre-registration gate member 34 includes spaced apart registration stop fingers 80. It is pivotally supported below the input station frame member 70 upon shaft 81 so that the fingers 80 project through openings 82 in the frame member. Initially the registration fingers 80 are supported as in FIG. 3 in raised position so as to block a document from entering the nip between the transport belt 42 and the platen P.

The upper registration chute 35 is also arranged to be pivoted about a shaft 83. When the registration fingers 80 are in their operative, or raised position, the upper registration chute 35 is in its lowered position as in FIG. 3. The upper registration chute 35 serves to limit the thickness of a document which can be inserted into the wait station 33 as well as serving to prevent documents from jumping the pre-registration gate 34. The upper chute 35 is biased in a counterclockwise direction about its pivot axis by gravity. Should a document remain lodged over the pre-registration gate fingers 80 when the gate is raised, the document will not be punctured since the upper chute 35 merely pivots upwardly.

Figure 3:
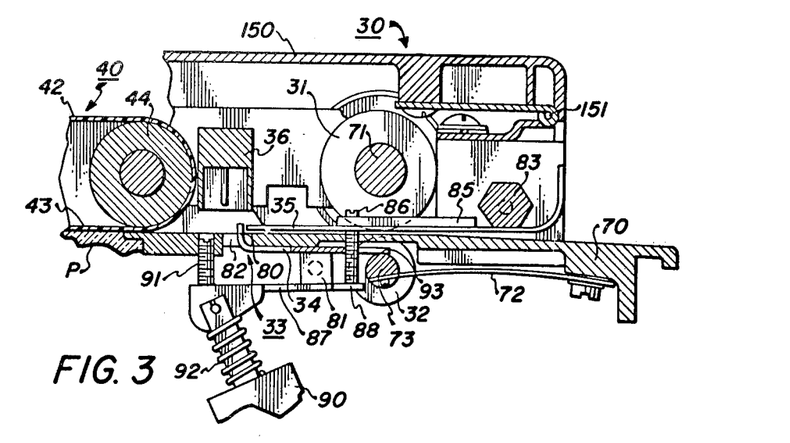
FIG. 3 is a partial sectional view of the input transport and wait station of the document handling apparatus.
Figure 6:
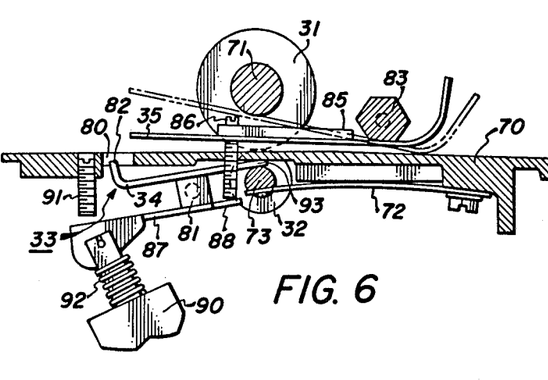
FIG. 6 is a partial sectional view of the input transport and wait station of FIG. 3 at a different stage of its operation.
Figure 7:
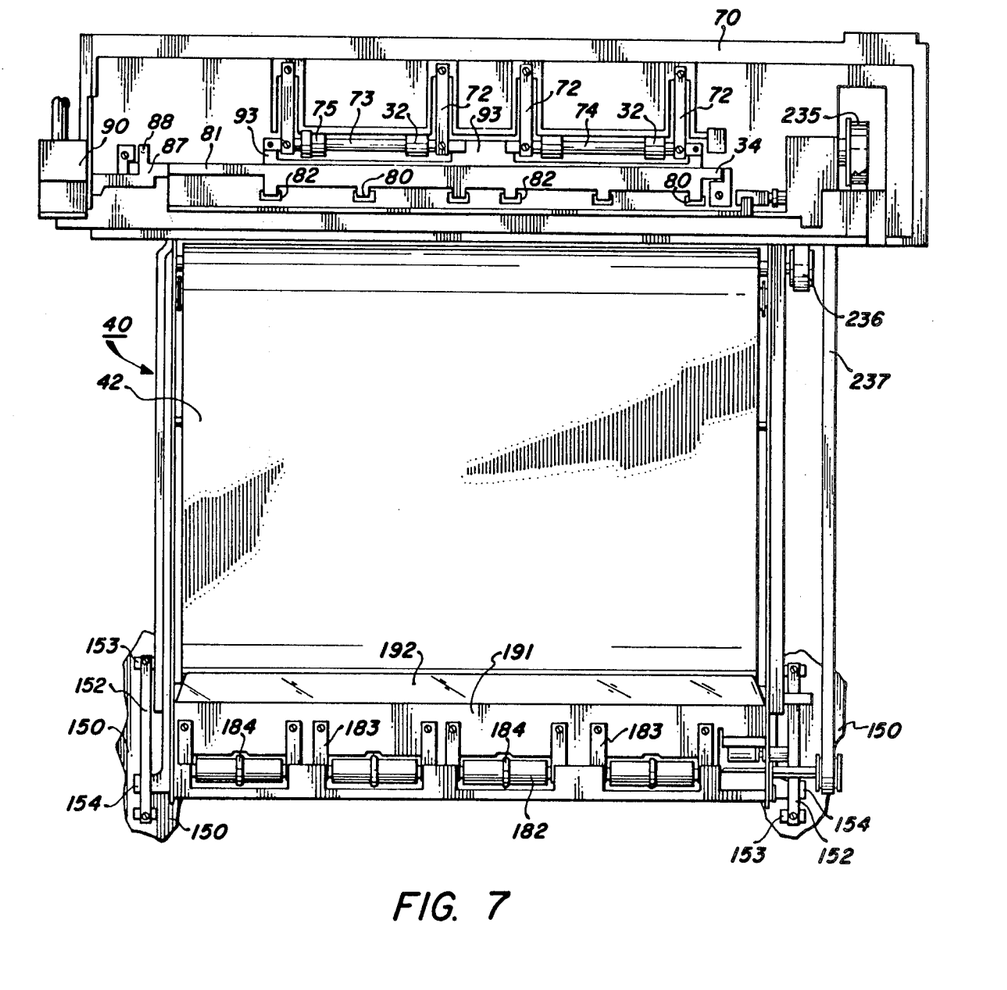
FIG. 7 is a partial bottom view of the document handling apparatus.

The upper chute 35 includes an arm 85 as in FIGS. 2, 3, and 6 having an adjustable set screw 86 therein. A plate-type actuating member 87 as in FIG. 7 is supported by the pre-registration gate 34 pivot shaft 81 and includes a tab 88 for engaging the set screw 86 connected to the upper registration chute 35. At the opposing end of this actuating member 87, a solenoid 90 is connected. In the operative position, as in FIG. 3, a set screw 91 in the input station frame 70 is used to limit the height to which the registration gate fingers 80 extend above the upper surface of the frame.

The positional arrangement shown in FIG. 3 comprises the operative position for pre-registering a document at the wait station 33. In this position the solenoid 90 is not actuated and a spring 92 biases the registration gate pivot shaft 81 so that the gate is normally in its raised position. The rear portion of the registration gate member 34 includes a plurality of tabs 93 as shown in FIG. 7 which engage the tops of the lower input roll shafts 73 and 74 at their ends so that when the fingers 80 are raised the tabs 93 deflect the lower pivot rolls 32 to separate them from the upper pinch rolls 31. This allows a sheet to be easily placed between the pinch rolls 31 and 32 and registered against the fingers 81.

To initiate the document handling mode of operation, a document is placed into the wait station 30 and up against the pre-registration fingers 80. The document is also registered against the input top cover registration strip 100 as in FIG. 2, to provide corner registration which is sensed by the input sensor 61.

After a suitable time delay the solenoid 90 is actuated to lower the input registration fingers 80 out of sheet blocking relationship as in FIG. 6. Since the registration member 34 has pivoted about its axis its tabs 93 no longer deflect the shafts 73 and 74 of the lower input rolls 30 so that the pinch of the input rolls 31 and 32 is closed to advance the document sandwiched therebetween into the belt transport station 40. The actuating member 87 connected to the registration member pivot shaft 81 operates upon the set screw 86 of the upper chute 35 to pivot it clockwise in order to widen the throat between it and the surface of the input frame casting 70. This serves to reduce the drag on the sheet as it is fed onto the platen. The upper chute 35 may be manually pivoted open even wider as shown in phantom to facilitate jam clearance. Therefore, upon actuation of the input station 30 solenoid 90, the fingers 80 are lowered, the upper chute 35 is raised, and the pinch of the input rolls 31 and 32 is closed to advance the document into the next station of the document handling system 11 which comprises the platen belt transport 40.

PLATEN BELT TRANSPORT SYSTEM

Referring now to FIGS. 2, 4, 5, 8, 9, 10, 11, and 12, the platen belt transport 40 will be described in greater detail. The platen belt transport 40 is supported within a frame assembly 105 comprised of front 106 and rear 107 adjustable side frame members, and input 108 and exit 109 end frame members. The frame assembly 105 is pivotally supported at the input station 30 about the input pinch roller drive shaft 71 by being suitably journaled thereabout.

Figure 4:
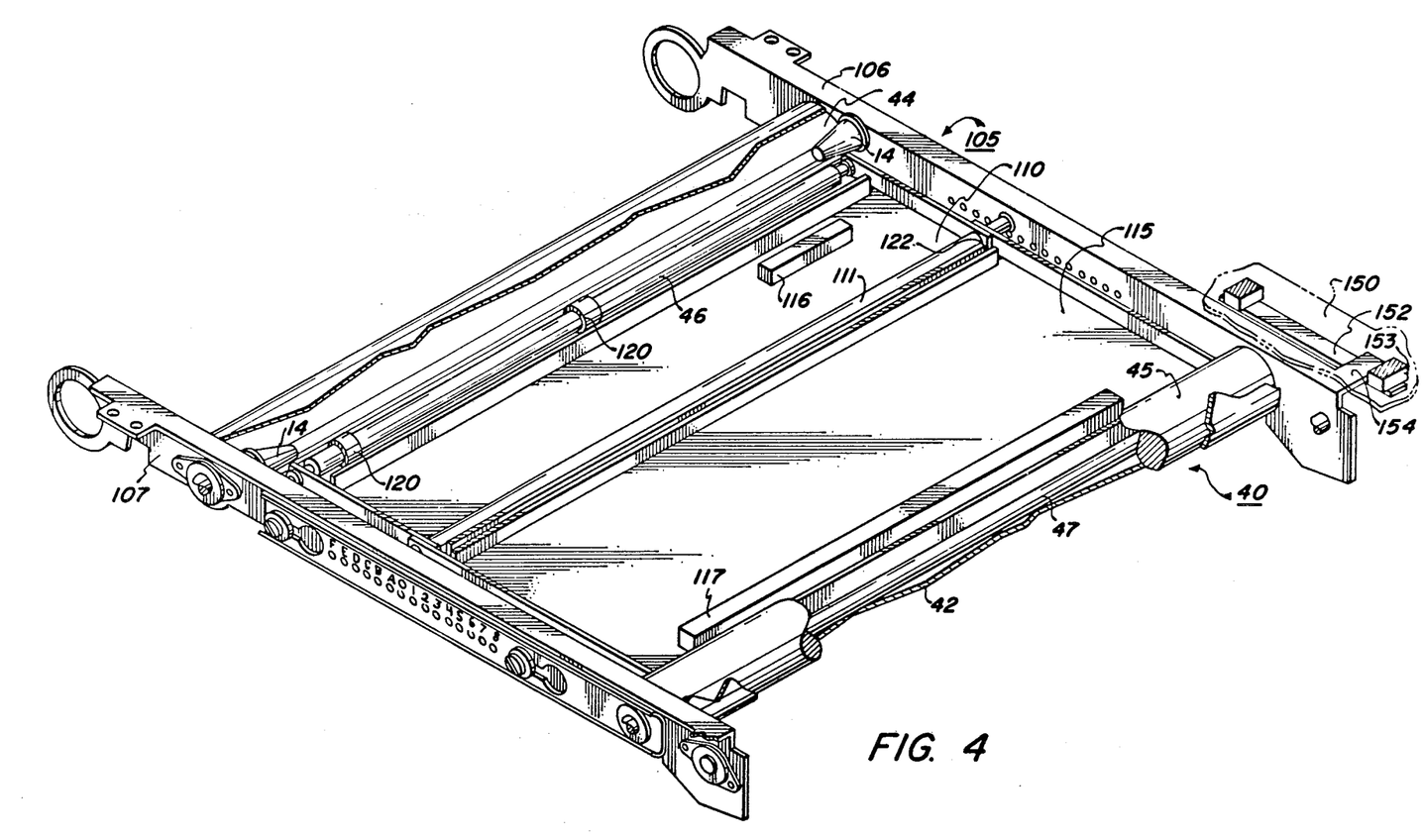
FIG. 4 is a partially cut-away perspective view of the platen belt transport of the document handling apparatus.

The platen belt transport 40 is comprised of a single wide stretch-type belt which is arranged about the input drive pulley 44 and an exit idler pulley 45. Both the input and exit pulleys 44 and 45 are journaled for rotation in the front and rear adjustable side frames 106 and 107. Internally of the belt 42, an input back-up roll 46 is pivotally supported by means of a pan-like frame member 110. The input back-up roll 46 is rotatably arranged at one end of the frame 110 member and the other end thereof is pivotally supported about a shaft 111 secured between the front and rear adjustable side frames 106 and 107 of the platen belt transport 40. A second pivotally supported pan-like frame member 115 is pivotally arranged at one end about the shaft 111 and rotatably supports the registration back-up roll 47 at its free end.

The frame member 110 supporting the input back-up roll 46 is shorter than the frame member 115 supporting the output back-up roll. The back-up rolls 46 and 47 are urged against the back of the belt 42 by their weight and the weight of their associated frame member 110 or 115. The normal force exerted by these rolls 46 and 47 against the belt 42 is important for obtaining the desired driving force between the belt and the document during advancement of the document. In order to provide the desired level of drive force, weights 116 and 117 are supported by the respective input and registration back-up roll frame members 110 and 115. Therefore, the normal force exerted by the back-up rolls 46 and 47 can be regulated by the size of the weights 116 and 117 and their positions on their respective pans 110 and 115.

It has been found that the platen P surface is not absolutely flat and that a variation occurs in the force with which the input back-up roll 46 urges the belt against the platen from the front to the back side of the platen. This can result in a significant loss in latitude for the setting of the input back-up roll normal force. Therefore, in accordance with one feature of the document handling system 11 herein, the input back-up roll is formed so that it includes two doughnut-shaped portions 120 or sections of enlarged diameter as in FIG. 4. These back-up roll sections 120 of enlarged diameter insure that the input back-up roll 46 applies a uniform pressure at the two points where it engages the platen belt 42 even if the platen P is not absolutely flat. This reduces the tendency for skewed feeding of the document onto the platen P. The aforenoted backup roll 46 construction results in a substantial improvement in the latitude of the platen belt transport reducing its sensitivity to the belt 42 tension and the height of the input drive pulley 44.

Cone-shaped members 121 rotatably supported about stub shafts mounted to the front and rear side frames 106 and 107 of the belt transport 40 are employed to insure that the belt properly tracks about the input and output pulleys 44 and 45. The long pan 115 is sufficiently flexible to insure adequate conformity of the registration back-up roll 47 across the platen. The front pan 110 is too short to assure such conformity, and, therefore, a slot 122 is provided in that pan. This slot 122 allows the pan to move about the pivot shaft 111 to insure conformity between the raised portions 120 of the roll 46 and the platen P, even if the platen is warped. The raised portions 120 of the input back-up roll 46 are arranged toward the rear of the document handler 11 so that it can properly handle shorter documents.

In order to balance the input back-up roll 46 loading the normal force assisting weight 116 is arranged toward the front side of the pan 110, thereby uniformly loading the roll against the belt 42 in the vicinity of the raised portions 120 of the roll.

VERNIER BELT TENSIONING SYSTEM

The vernier belt tensioning system 130 represents an inexpensive, high resolution system for obtaining a highly accurate setting of the parallelness of the pulleys 44 and 45. The system is capable of maintaining parallelness of the respective pulleys within about ± 0.005 to about ± 0.01 inches.

Figure 8:
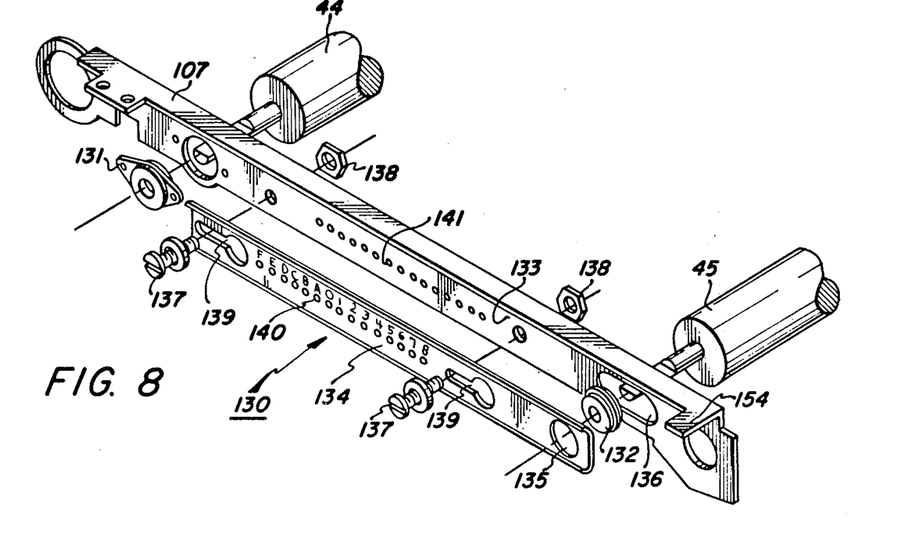
FIG. 8 is an exploded view of the adjustable side frames and drive rollers of the platen belt transport.
Figure 9:
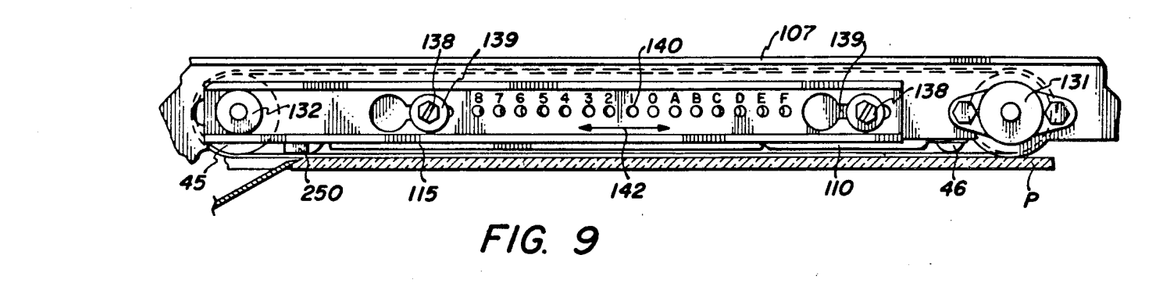
FIG. 9 is a partial side view of the front adjustable side frame of the platen belt transport.
Figure 10:
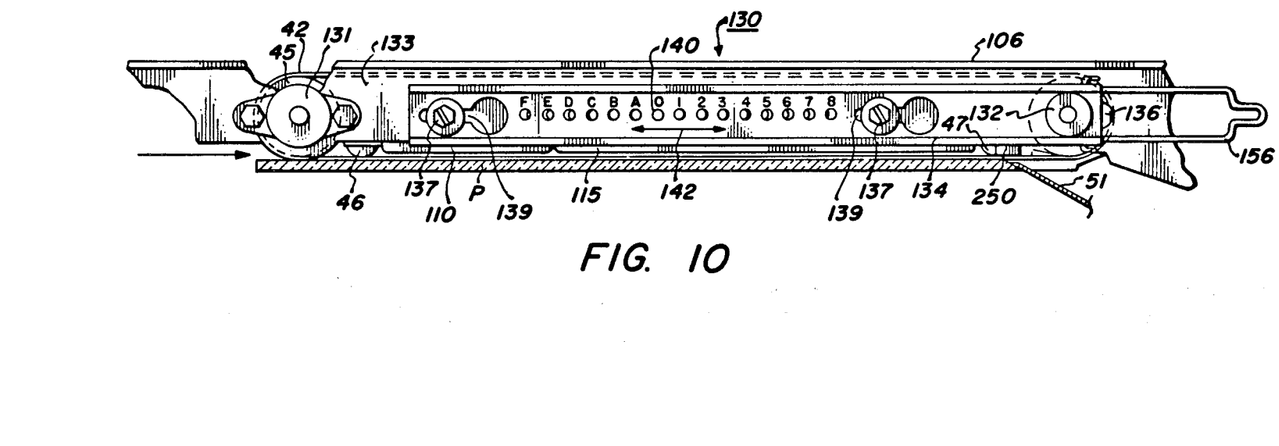
FIG. 10 is a partial side view of the rear adjustable side frame of the platen belt transport.

The cone-shaped members 121, which engage the upper run of the belt 42 at the front and rear sides thereof, are effective for overcoming minor excursions of the belt to maintain proper belt tracking. It is still required, however, that the input drive pulley 44 and the idler pulley 45 about which the belt 42 is supported, must be sufficiently parallel to avoid major excursions of the belt which would result in catastrophic loss of belt tracking. To insure this high degree of parallelness between the respective belt pulleys 44 and 45, a vernier belt tensioning system 130 is employed as shown in FIGS. 8-10.

The driving engagement between the belt 42 and the document is provided by the slack in the belt and the normal force applied through the belt by the input and registration back-up rolls 46 and 47. The normal force exerted by the belt against the document in the vicinity of the input and registration back-up rolls 46 and 47 plays a substantial roll in providing consistent skew-free feeding of the document. This normal force is controlled as aforenoted by the weight of the rolls and mounting assemblies 110 and 115. The belt 42 tension provides an off-setting force to the normal force of the rolls 46 and 47 by acting to lift the rolls away from the platen. The higher the belt tension the greater is the reduction in the effective normal force of the back-up rolls 46 and 47 at the platen. Therefore, it is important to be able to set the belt tension with a high degree of accuracy.

The belt tension is set for the document handling system 11 by means of the adjustable side frames 106 and 107 which include a vernier system 130 which allows the belt tension to be incremented in small amounts while maintaining the parallelness of the respective belt pulleys 44 and 45.

The drive belt pulley 44 is journaled for rotation in the front and rear side frames 106 and 107 by means of bearings 131. The idler pulley 45 is journaled for rotation by means of bearings 132 which are slidably sandwiched between the inner 133 and outer 134 vernier plates which comprise the adjustable side frames 106 and 107. The bearing 132 is positioned in a close fitting hole 135 in the outer plate 134 and slides within a slot 136 in the inner plate 133. The outer plate 134 is locked to the inner plate 133 by screws 137 and nuts 138 which are welded to the inner plate 133. Slots 139 in the outer plates 134 allow them to slide relative to the inner plates 133 for setting belt tension.

The vernier system 130 is comprised of a row of holes 140 spaced an equal distance apart arranged in the respective front and rear outer vernier plates 134. A second row of holes 141 spaced an equal distance, which is less that the spacing of the holes in row 140, are arranged in each of the respective inner vernier plates 133.

The difference in the hole spacings for the holes 140 in the outer vernier plates 134 as compared to the holes 141 in the inner vernier plates 133 provides the desired vernier type read-out when the rows of holes 140 and 141 are overlapped by application of the outer vernier side plates 134 to the inner vernier side plates 135. This difference in the hole 140 and 141 spacings in the vernier plates 133 and 134 results in only a single pair of holes in the respective plates 133 and 134 being completely aligned and concentric for any relative position of the vernier plates.

For example, if the difference in spacing for the holes 141 as compared to the holes 140 is about 0.03 inches then it is possible to adjust the vernier side plates 133 and 134 relative to one another accurately in intervals of 0.03 inches. Similarly, if the difference in the hole spacings were 0.01 inches, it would be possible to adjust the vernier side plates 133 and 134 in increments of 0.01 inches. Therefore, relative movement of the vernier side plates 133 and 134 in either direction of the arrow 142 in FIGS. 9 and 10 so that a new set of overlapped holes 140 and 141 lines up next adjacent to a previously aligned set of holes will result in a 0.03 incremental adjustment for a 0.03 inch difference in hole spacing.

The holes 140 in each vernier plate 134 are provided with indicia, as shown, such as numbers or letters. When a desired belt tension is achieved a pin is placed in the aligned vernier holes 140 and 141 of one side frame 106, for example, hole 0 in FIG. 9. The same holes 140 and 141 are aligned at hole 0 in the other side frame 107 and held by a pin. After the side frames 107 and 106 have thus been aligned and the proper belt tension set, the vernier plates 133 and 134 and locked in position by means of screws 137.

In order to set the belt tension, use is made of the relative movement between the document handler cover 150 and the document belt frame assembly 105. The frame assembly 105 is pivoted about the input roll drive shaft 71, whereas the cover is pivoted about a different hinge axis 151. This results in relative movement between the transport belt frame assembly 105 and the cover 150 when the cover is raised as in FIG. 13. The frame assembly 105 is slidingly secured to the cover by removable straps 152 mounted to bosses 153 on the cover. Tabs 154 on the side frames 106 and 107 slide on the straps 152 as the frames 105 slides down the cover 150 as the cover is raised.

To set the belt tension a fish scale or other suitable tension measuring device is secured between one end 155 of the cover 150 and a catch 156 which is secured on outer vernier plate 134. The screws 137 are loosened and the cover 150 is raised until the desired tension is reached, at which time note is taken of the vernier hole pair 140 and 141 which are aligned. A pin is then placed in that vernier hole pair. The cover 150 is then lowered and the tension measuring device removed. When the cover is raised again, a pin is similarly placed in the same hole pair 140 and 141 on the other side of the DHS frame assembly 105. The vernier plates 133 and 134 are then locked as aforenoted to maintain the desired belt tension and the desired parallinity between the respective belt pulleys 44 and 45.

PLATEN REGISTRATION SYSTEM

Figures 5, 12:
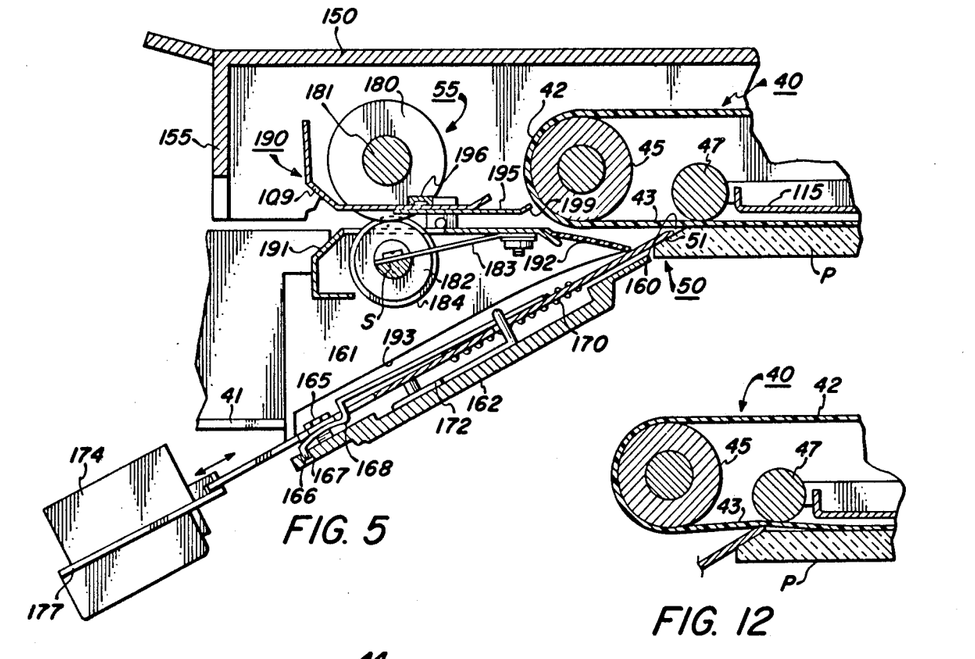
FIG. 5 is a partial cross-sectional view of the output transport and platen registration mechanism of the document handling apparatus.
FIG. 12 is a partial cross-sectional view of the output transport and platen registration mechanism of FIG. 5 at a different stage of its operation.
Figure 11:
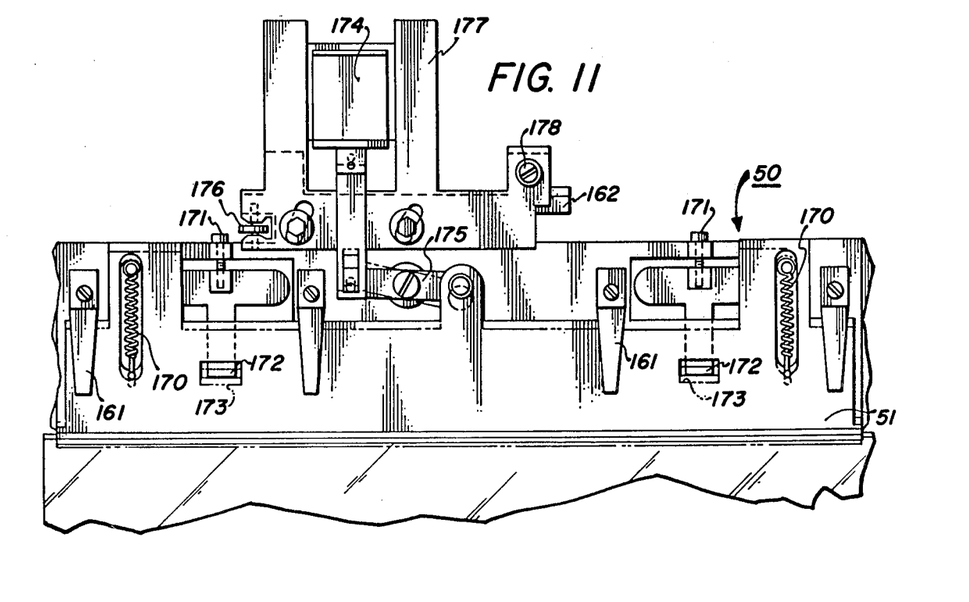
FIG. 11 is a partial top view of the platen registration mechanism.

The purpose of the platen belt transport 40 is to advance the document onto the platen, and against the platen registration gate 51 so that the document can then be scanned by the optical system 18 to provide one or more copies. Referring to FIGS. 5, 11, and 12, the platen registration system 50 is shown in greater detail. The registration gate 51 comprises a plate-like member which is comparatively thin and sufficiently flexible to conform to the beveled edge 160 of the platen P. The registration gate 51 is arranged for movement in a plane which is inclined with respect to the plane of the platen P.

In the system which will be described the registration edge 51 is normally maintained in its retracted position as in FIG. 5. This is desirable in order to reduce the possibility of operator injury by engagement with the edge of the registration gate 51 when the platen cover 150 and document handler is raised off the platen. The registration gate 51 is raised into its operative position for registering a document on the platen as in FIG. 12 only when the document is fed onto the platen P. As soon as the document has been registered the gate 51 is retracted so that the document can then be fed off the platen at the end of the copy cycle.

To insure confirmity between the gate member 51 and the beveled edge 160 of the platen P, a plurality of springs 161, as in FIGS. 5 and 11, are arranged spaced apart across the plate member to bias the gate against the platen edge. Four springs 161 are shown. Each is secured to the registration gate frame 162 and urged against the gate member 51 in cantilever fashion. Because of the variability of the springs 161 the force exerted by each spring is adjustable so that proper conformity can be maintained between the registration gate 51 and the beveled edge 160 of the platen glass P. This adjustment is provided by the mounting screws 165 which hold the springs to the frame 162. One end 166 of the spring 161 is secured in a slot 167 in the registration gate frame 162 and the other end is urged against the gate surface. Tightening the screw 165 increases the spring pressure and loosening the screw 165 reduces the spring pressure. The spring 161 includes a step 168 which is cantilevered to allow the spring force adjustment. These springs 161 are operative to correct for edge bowing of the gate member 51 and for spring and casting 162 tolerances.

The registration gate 57 is arranged for sliding movement on the registration gate frame 162. It is urged to its retracted position by means of tension springs 170. Screw 171 adjustable stop members 172 are provided which include projections which pass through slots 173 in the registration gate 51 to limit its range of travel. Actuation of the gate 51 is provided by means of a solenoid 174 which is connected to the gate by means of a pivotally supported link 175. The operative stroke of the solenoid 174 is adjusted by means of an adjustment screw and wheel 176 embedded in the frame 162 which moves the solenoid support frame 177 with respect to the register edge frame 162 about pivot screw 178. Screws 179 lock the position of the solenoid frame 177 on the gate frame 162.

Referring to FIGS. 5 and 12, the operation of the platen registration gate is shown in greater detail. In its operative position, as in FIG. 5, the register edge 51 engages the belt 42 so as to raise the register back-up roll 42 off the platen to create a registration "pocket" as shown. This results in a decrease in the normal force of the belt against the document as it is advanced into registration against the gate 51. This is desirable since it reduces the occurrence of document damage. The document is advanced into engagment with the gate 51 by a coast overdrive of the belt transport 40. This removes any document skew and properly positions the document on the platen P for imaging.

After the document has been properly registered on the platen P, the gate 51 is withdrawn to its retracted position as in FIG. 5. This also results in dropping the register roll 47 back into engagement with the document through the belt 42 at a desired normal force which is effective to advance the document off the platen by actuation of the belt transport 40. If another document has been preregistered in the wait station 33, it is fed onto the platen P simultaneously as the previous document is fed off the platen. If another document is not pre-registered, the first document is fed off the platen P before another document is fed on.

The document which is advanced off the platen P is fed into the nip of the output rolls 55. The output rolls 55, as in FIGS. 2, 5, and 7, comprise an upper set of rolls 180 supported about the output roll drive shaft 181. The lower set of idler rolls 182 are mounted on individual shafts S and cantilevered spring 183 biased for engagement with the upper output 180 rolls. The lower idler output rolls 182 include an enlarged diameter central ring 184 which is located between the engaging upper output drive rolls 180. This arrangement serves to corrugate the document as it is advanced by the output rolls 55 into the output tray 41. This aids in obtaining adequate travel of the document before it engages the other documents in the output tray so that it will properly stack in the output tray.

A guide chute 190 is associated with the output rolls 55. The lower guide chute 191 is extended by means of a Mylar strip 192 so it flexibly engages the registration gate cover 193 thereby preventing a sheet from being driven downwardly into the registration gate area rather than out through the output roll chute 190. The upper chute 194 also includes slidable extension 195 which it adjustably supports. The chute extension 195 comprises a plate member which includes a plurality of tabs 196 which extend through cooperating slots 197 in the upper chute as in FIG. 2. Leaf-type springs 198 are inserted through holes in the tabs 196 and serve to mount the adjustable chute extension 195 to the upper chute 194 so that it can be adjusted to provide a desired gap 199 with respect to the belt 42. This gap 199 preferably is on the order of about 0.03 inches so as to reduce the propensity for a document sheet to jam into the interface between the output rolls 55 and the belt transport 40.

COUNTERBALANCE MECHANISM

While most copying operations will be performed with the document handler 11 in its operative position over the platen P, it is also desirable for copying books, etc., to be able to manually locate documents on the platen. This is accomplished by raising the document handler cover 150 to lift the document handler off the platen. A counterbalance mechanism 200, as in FIGS. 2 and 13, is provided for off-setting the weight of the document handler 11 and cover 150 to make it easy to raise or lower them. The counterbalance mechanism 200 is comprised of a gas spring 201 of the general type which may be obtained from the Gas Spring Corporation, 17 Commerce Drive, Montgomeryville, Pennsylvania, and sold under Part Number 01111-B.

The gas spring cylinder 201 is pivotally secured at one end to a boss 204 on the input station frame casting 70. The gas spring piston rod 202 is pivotally secured at its free end to a boss 203 on the document feeder cover 150. Oil has been added to the gas spring cylinder 201 in order to provide a damping effect as the cover is raised or lowered. The oil in the gas spring causes it to act like a dash pot and prevents the cover 150 from falling too fast as it is closed. When the cover is at about 15° to the horizontal plane of the platen it falls closed since there is insufficient force in the gas spring to oppose its closing.

The force necessary to raise the cover 150 and its associated document handler 11 is not uniform throughout the range of motion of the cover. For example, as the cover 150 get more vertical the force of the cover and document handler against the gas spring is markedly reduced. To compensate for this reduction in the opposing force of the document cover 150 and handler 11, a compensating spring 205 is provided which is pivotally secured to the boss 206 on the input casting 70. The compensating spring includes a U-shaped hook 207 at its other end which rides on a pin 208 secured to the boss 203 of the document handler cover 150.

As the cover is raised to about 20° to the horizontal the compensating spring 205 begins to stretch and thereby apply a counter force to the gas spring 201. The amount of this compensating force increases as the document feeder cover is raised and the compensating spring 205 expands. This combination of the gas spring 201 and compensating spring 205 provides a more correlated force distribution on the cover 150 and document handler 11 to prevent a rapid — uncontrolled swing during the opening or closing thereof.

The cover 150 and document handler 11 of this invention are movable from the horizontal over a range of motion of from about 0° to about 105°. This means that the cover and document handler moves past vertical. The counterbalance mechanism 200 provides a unique compound type of action over that range of motion. A force is applied by the gas spring 201 to initially lift the platen cover 150. The compensating force of spring 205 is then applied at about 20° to counter the force of the gas spring as the force exerted by the cover 150 decreases. The amount of this compensating force increases as the cover is raised. As the cover passes the vertical plane the compensating spring 205 acts to balance and counter the force of the cover which is then increasing.

The counterbalance mechanism 200 is particularly adapted to be employed within a confined space. Normally, the document feeder 11 and cover 150, as well as the gas spring 201, and tension spring 205 lie generally horizontally. The gas spring 201 is inclined about 5° to 10° to the horizontal in order to provide the necessary leverage for opening the cover 150. Since the gas spring 201 is inclined generally horizontally, a large force is necessary to lift the cover initially, falling off drastically as the cover moves between 45° to 105° from the horizontal.

The compound counterbalance mechanism 200 provides a self-closing platen cover 150 since the force of the gas spring is inadequate to support the platen cover at an inclination of less than about 15° to 20° to the horizontal. The mechanism 200 enables the platen cover 150 and document handler 11 to be lifted and held in any desired position over a wide range of orientations.

If desired, the tension spring 205 can be made adjustable to off-set tolerance build-ups and optimize the inter-relationship between it and the gas spring 201. A tension spring adjustment system is not shown in the drawings, however, it could comprise a turn-buckle interposed between the U-shaped hook 207 and the coiled portion of the spring 205. The leg of the U-shaped hook 207 connected to the coiled portion is severed and the resulting ends threaded and connected together by the turn-buckle. In this manner the force exerted by the compensating spring 205 could be increased or decreased by adjusting the turn-buckle to increase or decrease the extension spring.

MANUAL REGISTRATION EDGE

When the document handler 11 is raised to do copying by manual placement of documents on the platen P, the normal document registration edge 51 is in its retracted position as described above. Therefore, it is necessary to provide some means for providing manual registration of a document on the platen P. This is achieved in accordance with this document handling system 11 by means of a retractable manual registration edge mechanism 210 as in FIGS. 13 and 14. The manual registration edge 211 is located at the rear or top edge of the platen P. It comprises a plate-like member 212 which is arranged to slide on and off the platen P. A parallelogram-type linkage is used to provide the sliding movement. A first member 213 is secured to the optical frame 214 by screws 215. Two parallel, but spaced apart pivoting links 216 and 217 are pivotally secured at one end to the first member 215 and at their other end to the movable registration member 212. A tension spring 218 biases each of the links 216 and 217 toward the extended position or operative position for the registration member shown in solid lines. A cable 219 is secured to one of the pivoting links 216 at one end and to an actuating member 220 mounted on the document handler cover 150 as in FIG. 13 at its other end.

Figure 14:
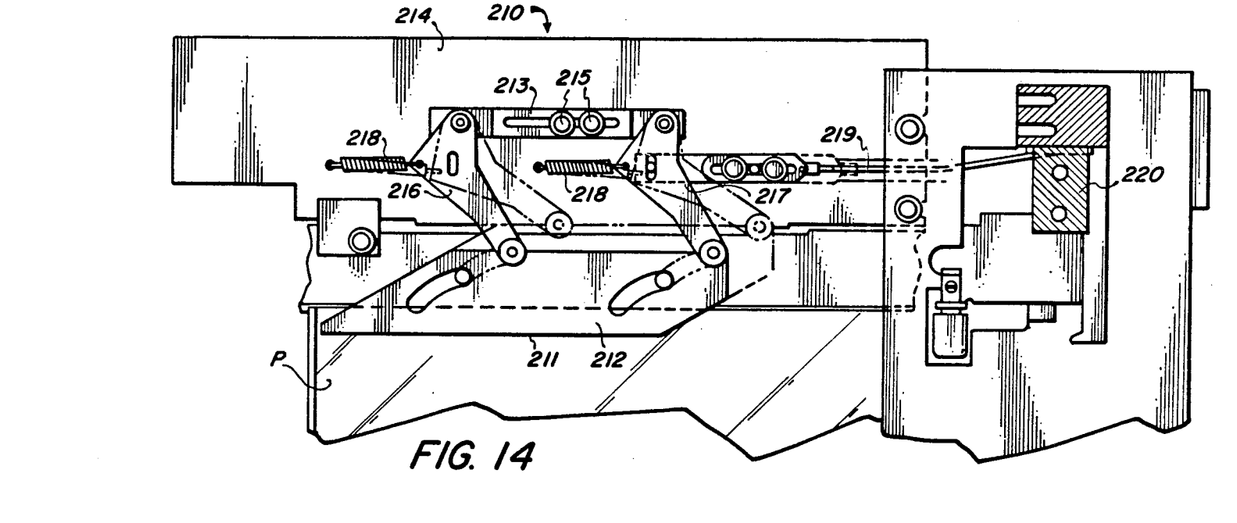
FIG. 14 is a partial top view showing the retractable manual registration guide.

When the cover 150 is raised as in FIG. 13, the cable 219 is slack so that the manual registration edge 211 is operatively positioned over the platen P as in FIG. 14. When the cover is closed as shown in phantom in FIG. 13, the movement of the actuating arm 220 pulls the cable taught and retracts the manual registration edge 211 to the position shown in phantom in FIG. 14. Therefore, the manual registration edge 211 is present over the platen P only when the document feeder cover 150 and document feeder 11 are raised off the platen surface. When the document feeder cover 150 is in its normal operative position over the platen surface the manual registration edge is retracted. This avoids interference between the manual registration edge 211 and the documents being advanced onto the platen by belt transport 40.

DOCUMENT HANDLER DRIVES

The drive motor 230 is connected to the document handler 11 via clutch and pulley 65, timing belts 231 and 232 and intermediate pulleys 233 and 234 as shown in FIG. 13. The timing belt 232 is wrapped about the outboard drive pulley 235 on shaft 71 as in FIG. 2. Timing belts 236 and 237 are used to tap the drives input to shaft 71 for connection to the belt drive pulley 44 and the output drive rollers 180.

OUTPUT TRAY AND DOCUMENT DECELERATOR

Figure 15:
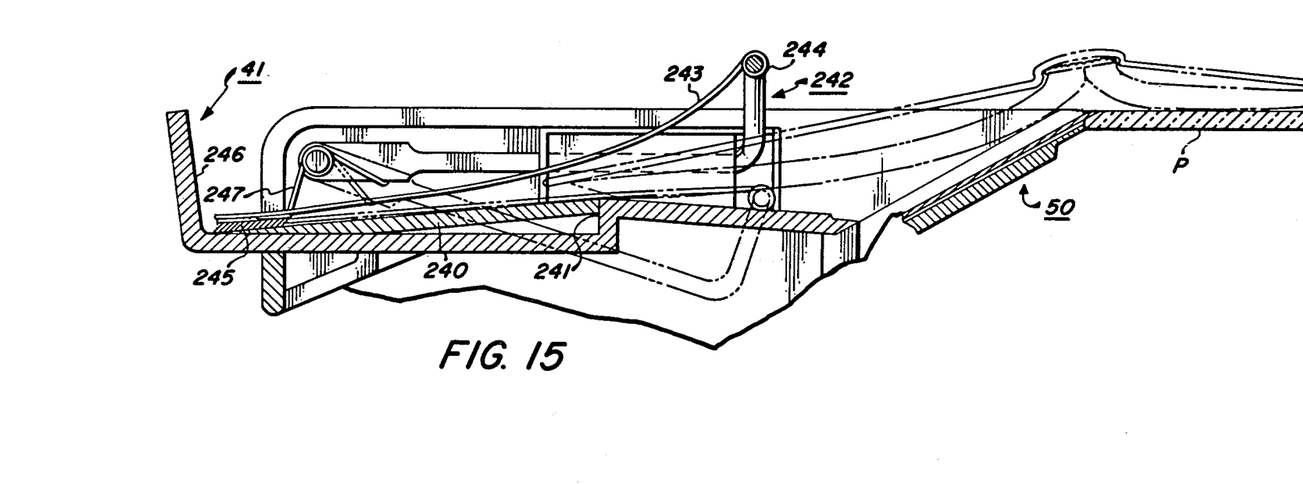
FIG. 15 is a partial cross-sectional view of the output tray and document decelerator associated with the document handling apparatus.

Referring now to FIGS. 1, 2, and 15, the document output tray 41 and document decelerators 56 features are shown in greater detail. The output tray 41 includes a step or depression 240 at its downstream end which serves to collect and appropriately stack small sized documents. If a larger document is copied, it would extend over the lip 241 of the depression 240 in the tray 41.

A document decelerator support bar 242 is pivotally supported for movement between the positions shown in solid lines and in phantom. The bar is biased upwardly by spring 247. In the solid line position the bar 242 supports two Mylar strips 243 which act to decelerate documents exiting from the document handler. The documents pass under the upper run 244 of the bar 242 and engage the Mylar strips 243 which act to decelerate and stack the documents in the tray. Improved document stacking and deceleration is accomplished by means of brush-type pads 245 secured to the free ends of the cantilever mounted Mylar strips 243. The brush pads 245 include fibers that are angled with respect to the direction of document advancement, namely, they are inclined forwardly and downwardly of the direction of document advancement. As a document engages the fiber pads 245 it passes easily in the direction in which it is moving because of the inclination of the fibers. However, when the document reaches the end face 246 of the output tray 41 and attempts to reverse its direction of movement, the frictional resistance between the fibers of the pads 245 and the document is increased because of their inclination. The increased frictional resistance causes the documents to stop and stack in a neat pile generally against the end face 246 of the output tray 41.

Preferably in accordance with this invention the coefficient of friction between the documents and the fibers of the pads 245 is approximately about .2 or less in the direction in which the sheets are advanced into the output tray 41. In the reverse direction, however, the frictional forces exerted by the fibers of pads 245 should provide a coefficient of friction greater than about 1.

While any desired material can be employed for the fibrous pads 245, a material produced by Collin and Aikman, called "Climber" IF-3961 provides excellent results. Alternatively, a Fibertran type material as in the Sanchez, et al. patent could be employed.

The material may be installed as a flat type pad as shown in FIG. 15 or alternatively it could be applied to a roller at the end of a sheet deflector. Both approaches have been shown to provide successful results. An example of a roller at the end of a sheet deflector is found in U.S. Pat. No. 3,709,492 to Baker, et al. noted in the background of this application. The pad shown in the Figures could be easily applied to that roller surface to give the same result.

The strips 243 preferably are resilient so that their cantilever mounting serves to bias the pads 245 downwardly toward the bottom of the tray. The resiliency of spring-like nature of the strips also provides improved damping and deceleration of the document as compared to a rigid member.

If it is desired to do book copying, the decelerator support bar 242 is in the way. However, it can be deflected downwardly, as shown in phantom, so that a book can be easily laid over it and the platen P. The registration gate assembly 50 has been inclined with respect to the plane of the platen P as described above. This orientation provides an ideal book registration edge, so that it is not necessary to break the binding of a book as it is placed on the platen for copying. Deflection of the bar 24 allows the book to be easily placed over the platen without interference with the bar.

The control system for operating the document handling system described above does not form a part of the present invention and any desired system could be employed as are known in the prior art.

The patents, applications, and texts referred to specifically in this application are intended to be incorporated by reference into the application.

It is apparent that there has been provided in accordance with this invention a counterbalancing apparatus which fully satisfies the objects, means and advantages set forth hereinbefore. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. Apparatus for counterbalancing a movable member comprising:
   a member;
   means for supporting said member for movement between a first position and a second position different from said first position;
   means for counterbalancing the movement of said member between said positions, said counterbalancing means comprising:
   a gas spring connected to said member; and
   a tension spring connected to said member, said tension spring being arranged to increasingly counter the force exerted by said gas spring as said member is moved from said first position to said second position.

2. An apparatus as in claim 1, wherein said member comprises a cover member and wherein said first position comprises a closed position and said second position comprises an open position.

3. An apparatus as in claim 2, wherein said cover member support means comprises means for pivotally supporting said cover.

4. An apparatus as in claim 1, wherein said first position is generally horizontal and wherein said second position is more vertical than said first position, whereby the force exerted by said member against said gas spring is reduced as said member moves from said first position to said second position, and the increasing counter force exerted by said tension spring against said gas spring provides a more correlated counterbalancing of the member over its range of motion.

5. An apparatus as in claim 4, wherein said tension spring is arranged so that it is operative only over a range of member motion beginning from a position intermediate said first and second positions, up to said second position.

6. An apparatus as in claim 4, wherein said member is arranged for movement past the vertical whereby said tension spring provides a counterbalance force to the movement of said member between vertical and said position past vertical.

7. An apparatus as in claim 6, wherein said tension spring is arranges so that it is operative only over a range of member motion beginning from a position intermediate said first and second positions, up to said second position.

8. An apparatus as in claim 7, wherein said member comprises a cover member and wherein said first position comprises a closed position and said second position comprises an open position.

9. An apparatus as in claim 8, wherein said gas spring is positioned inclined to the horizontal less than about 10° when said cover member is positioned in said first position.

10. An apparatus as in claim 9, wherein said cover member and said counterbalancing means comprise part of a reproducing machine further including, a viewing station and wherein said cover member in said closed position overlies said viewing station.

11. An apparatus as in claim 10, wherein said reproducing machine further includes means for advancing documents on and off said viewing station, said document advancement means being supported in said cover member.

12. An apparatus as in claim 11, wherein said viewing station comprises a transparent viewing platen and wherein said document advancing means comprises a belt-type transport, said transparent viewing platen lying generally horizontally and said belt transport being arranged generally horizontally when said cover is closed, said belt transport moving with said cover between said first and second positions whereby said belt transport overlies said platen when said cover is closed and is spaced from said platen when said cover is open.

13. An apparatus as in claim 12, wherein said reproducing machine further includes means for forming an image of a document at said platen on a sheet of support material.

14. An apparatus as in claim 13, wherein said image forming means comprises a photosensitive surface arranged for movement;
   means for forming an electrostatic image of said document at said platen on said photosensitive surface;
   means for developing said electrostatic image to render it visible; and
   means for transferring said visible image to said support sheet.

* * * * *